United States Patent [19]

Stillions, Jr. et al.

[11] Patent Number: 5,695,121
[45] Date of Patent: Dec. 9, 1997

[54] SELF CONTAINED PORTABLE SPRAYER SYSTEM

[76] Inventors: Richard Harlan Stillions, Jr., 1609 Terrace Rd., Cleveland, Miss. 38732; Thomas Allen Agostinelli, Sr., P.O. Box 25, Lyon, Miss. 38645; Jack Reed Tidwell, Sr., 1604 Deering St., Cleveland, Miss. 38732; David Robin Leard, 417 Lincoln Ave., Greenwood, Miss. 38930

[21] Appl. No.: 570,535

[22] Filed: Dec. 11, 1995

[51] Int. Cl.$^6$ ........................................ B05B 9/00
[52] U.S. Cl. .................... 239/126; 239/172; 239/373
[58] Field of Search .................... 239/126, 146, 239/147, 149, 170, 172, 302, 373, 375, 526, 532, 722

[56] References Cited

U.S. PATENT DOCUMENTS

| | | | |
|---|---|---|---|
| 1,277,269 | 8/1918 | Sturcke | 239/722 X |
| 2,227,222 | 12/1940 | Henderson | 239/373 X |
| 3,977,602 | 8/1976 | Kirch | 239/722 X |
| 4,269,356 | 5/1981 | Rose | 239/170 X |
| 4,725,004 | 2/1988 | Baran, Jr. | 239/172 X |
| 4,865,255 | 9/1989 | Luisotto | 239/149 |

FOREIGN PATENT DOCUMENTS

| | | | |
|---|---|---|---|
| 1163201 | 9/1969 | United Kingdom | 239/172 |

Primary Examiner—Andres Kashnikow
Assistant Examiner—Steven J. Ganey

[57] ABSTRACT

A self contained portable sprayer system including a tank for receiving a fluid mixture and has a top portion with a cap coupled by a threadable connection. The tank has a flat bottom portion. A fluid release valve with a fluid release tube threadably connected to the top portion of the tank. The release valve has a pair of flexible hoses. A pressure switch that has an air receiving tube at one end threadably connected to the top portion. The pressure switch has a pressure hose. A pressure release valve is positioned on the top portion of the tank. A towing hitch for carrying the tank has, an elongated vertical portion, a short vertical portion, and a flat lower portion. The elongated portion has a distal side with a pair of wheels, and one shelf supporting a power source. The lower portion seats the tank when positioned within the towing hitch. Lastly, a cyclic air pump is positioned on another shelf of the elongated portion and forces air into the tank.

10 Claims, 3 Drawing Sheets

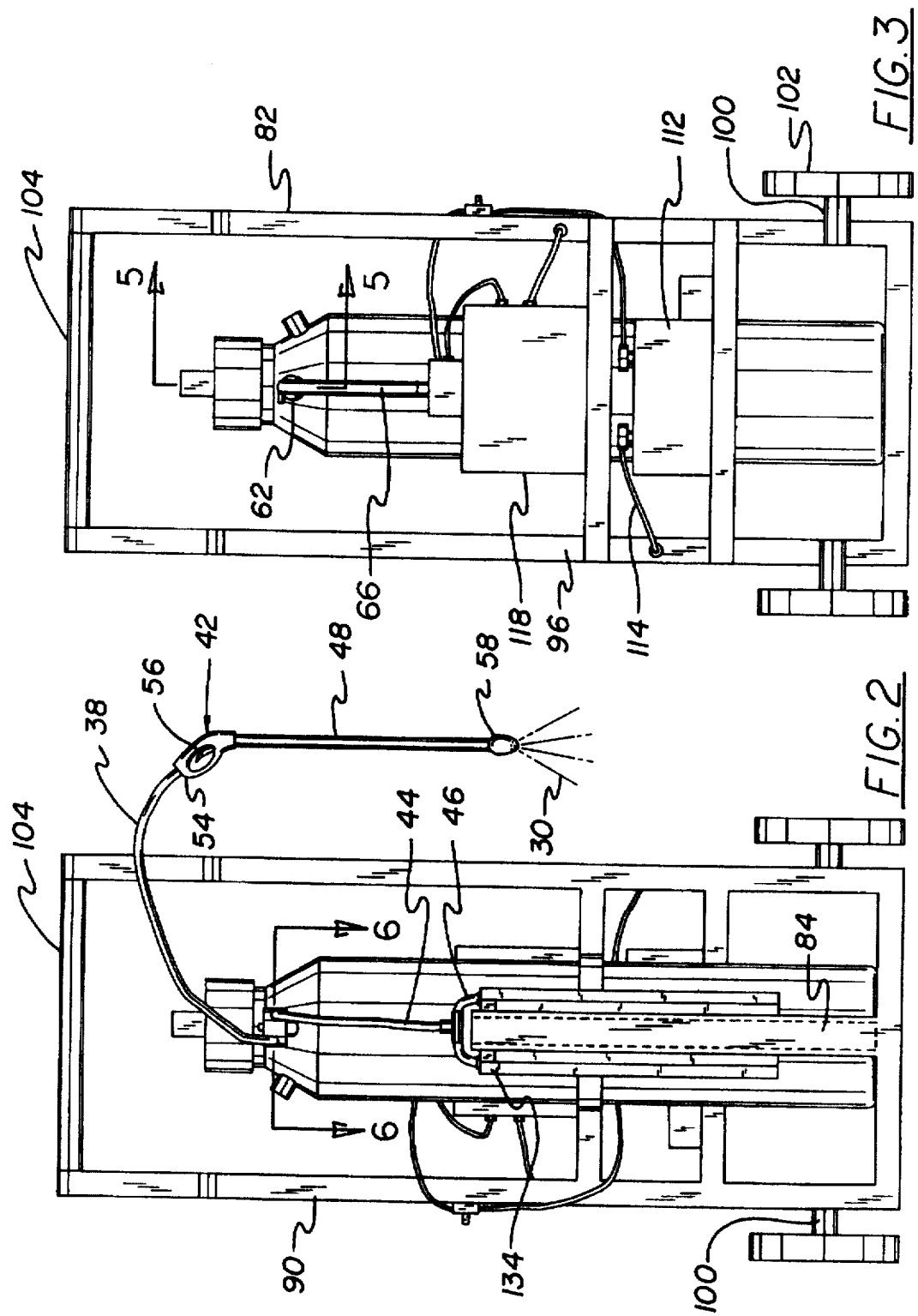

SELF CONTAINED PORTABLE SPRAYER SYSTEM

BACKGROUND OF THE INVENTION

1. Field of the Invention

The present invention relates to a self contained portable sprayer system and more particularly pertains to providing a sprayer system that has a tank carried by a hitch with framework for presenting a battery and pumping source, and further allowing the battery and pumping source to be in operable association with the tank for creating a pressurized spraying system.

2. Description of the Prior Art

The use of a portable spray unit is known in the prior art. More specifically, portable spray units heretofore devised and utilized for the purpose of spraying a fluid are known to consist basically of familiar, expected, and obvious structural configurations, notwithstanding the myriad of designs encompassed by the crowded prior art which has been developed for the fulfillment of countless objectives and requirements.

By way of example, U.S. Pat. No. Des. 303,446 to Kitts, Hattori, Bransky, and Sheldon discloses a portable hose cart. U.S. Pat. No. 4,725,004 to Baran, Jr. discloses a portable spray unit. U.S. Pat. No. 4,671,315 to Gardener discloses a portable brushfire hydrant. U.S. Pat. No. 4,609,149 to Jessen discloses an injection gun system for lawn treatment. U.S. Pat. No. 4,341,350 to Wemmer discloses a chemical injection system for high pressure washers. Lastly, U.S. Pat. No. 4,238,074 to Coons discloses an attendant propelled portable spraying apparatus.

While these devices fulfill their respective, particular objectives and requirements, the aforementioned patents do not describe self contained portable sprayer system that allows a person to transport large quantities of a herbicide, insecticide, or pre-emergents in a pressurized tank for spraying an area, with the tank being towed by a towing hitch that carries a power source and air pump, and the air pump is designed to add pressure to the tank for pressurized release of the fluid within the tank.

In this respect, the self contained portable sprayer system according to the present invention substantially departs from the conventional concepts and designs of the prior art, and in doing so provides an apparatus primarily developed for the purpose of providing a sprayer system that has a tank carried by a hitch with framework for presenting a battery and pumping source, and further allowing the battery and pumping source to be in operable association with the tank for creating a pressurized spraying system.

Therefore, it can be appreciated that there exists a continuing need for a new and improved self contained portable sprayer system which can be used for providing a sprayer system that has a tank carried by a hitch with framework for presenting a battery and pumping source, and further allowing the battery and pumping source to be in operable association with the tank for creating a pressurized spraying system. In this regard, the present invention substantially fulfills this need.

SUMMARY OF THE INVENTION

In view of the foregoing disadvantages inherent in the known types of portable spray units now present in the prior art, the present invention provides an improved self contained portable sprayer system. As such, the general purpose of the present invention, which will be described subsequently in greater detail, is to provide a new and improved self contained portable sprayer system and method which has all the advantages of the prior art and none of the disadvantages.

To attain this, the present invention essentially comprises a cylindrical pressurized tank that has a top portion and a flat bottom portion. The top portion of the tank has a tank throat with a cap that is coupled thereto. The tank cap is coupled to the tank throat by a threadable connection. The tank receives a fluid mixture that may be pressurized. Also, a three-way fluid release valve is included. The fluid release valve has a fluid release tube at one end and a pair of flexible hoses at another end. The fluid release tube is threadably connected to the top portion of the tank. The fluid release tube allows the fluid mixture from the tank to pass therethrough. The pair of flexible hoses form a first hose with a fluid control valve and a second hose with a splitter connector. The fluid control valve has a wand. A pressure switch is provided. The pressure switch has an air receiving tube at one end and a pressure hose at another end. The air receiving tube is threadably connected to the top portion of the tank. The pressure switch controls the amount of pressurized air that enters the tank. A pressure release valve is included and positioned on the top portion of the tank. Included is a J-framed towing hitch that has an elongated vertical portion, a short vertical portion, and a horizontal lower portion. The elongated vertical portion has a proximal side with a rigid semi-circular band that extends therefrom. The horizontal lower portion is flat to allow the tank to be seated when positioned within the towing hitch. The band retains the tank in position when it is within the hitch. The elongated vertical portion has a distal side with a pair of L-shaped projections spaced from the lower portion and affixed. Each projection has a perpendicular end with a wheel rotatably mounted. The distal side has a pair of rectangular shelves that are proportionately spaced above the L-shaped projections. The shelves are rigidly affixed to the distal side and in parallel planes. The pair of shelves form a top shelf and a bottom shelf with the bottom shelf capable of supporting a power source. A cyclic air pump is seated on the top shelf and is capable of receiving the pressure hose that extends from the tank. The air pump forces air into the tank through the pressure hose and places the fluid in the tank under pressure for eventual fluid release. The air pump is powered by the power source seated on the frame. The power source is activated by a switch attached to a side of the elongated portion. Lastly, a dual boom is rotatably mounted to the short vertical of the frame. The boom has a pair of receiving ends that couple the splitter connector. The boom allows the fluid of the tank to be released separate from the wand.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved self contained portable sprayer system which has all of the advantages of the prior art portable spray unit and none of the disadvantages.

It is another object of the present invention to provide a new and improved self contained portable sprayer system which may be easily and efficiently manufactured and marketed.

It is further object of the present invention to provide a new and improved self contained portable sprayer system which is of durable and reliable constructions.

An even further object of the present invention is to provide a new and improved self contained portable sprayer system which is susceptible of a low cost of manufacture with regard to both materials and labor, and which accordingly is then susceptible of low prices of sale to the consuming public, thereby making such self contained portable sprayer system economically available to the buying public.

Still yet another object of the present invention is to provide a new and improved self contained portable sprayer system which provides in the apparatuses and methods of the prior art some of the advantages thereof, while simultaneously overcoming some of the disadvantages normally associated therewith.

Even still another object of the present invention is to provide a self contained portable sprayer system for providing a sprayer system that has a tank carried by a hitch with framework for presenting a battery and pumping source, and further allowing the battery and pumping source to be in operable association with the tank for creating a pressurized spraying system.

Lastly, it is an object of the present invention to provide a new and improved self contained portable sprayer system including a tank that receives a fluid mixture. The tank has a top portion with a cap that is coupled to the tank by a threadable connection, and a flat bottom portion. Included is a fluid release valve that has a fluid release tube at one end threadably connected to the top portion. The release valve has a pair of flexible hoses at another end. A pressure switch that has an air receiving tube at one end threadably connected to the top portion, is included. The pressure switch has a pressure hose at another end. A pressure release valve is positioned on the top portion of the tank. A towing hitch for carrying the tank is included. The hitch has an elongated vertical portion, a short vertical portion, and a flat lower portion therebetween. The elongated portion has a proximal side and a distal side. The lower portion seats the tank when positioned within the towing hitch. The distal side has a pair of wheels rotatably mounted, and a pair of shelves with one shelf supporting a power source. Lastly, a cyclic air pump is positioned on another of the shelves and forces air into the tank.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a frontal view of the preferred embodiment of the present invention in an operable configuration.

FIG. 3 is a rear view of the present invention in an operable configuration.

The same reference numerals refer to the same parts through the various Figures.

DESCRIPTION OF THE PREFERRED EMBODIMENT

Figure 1:
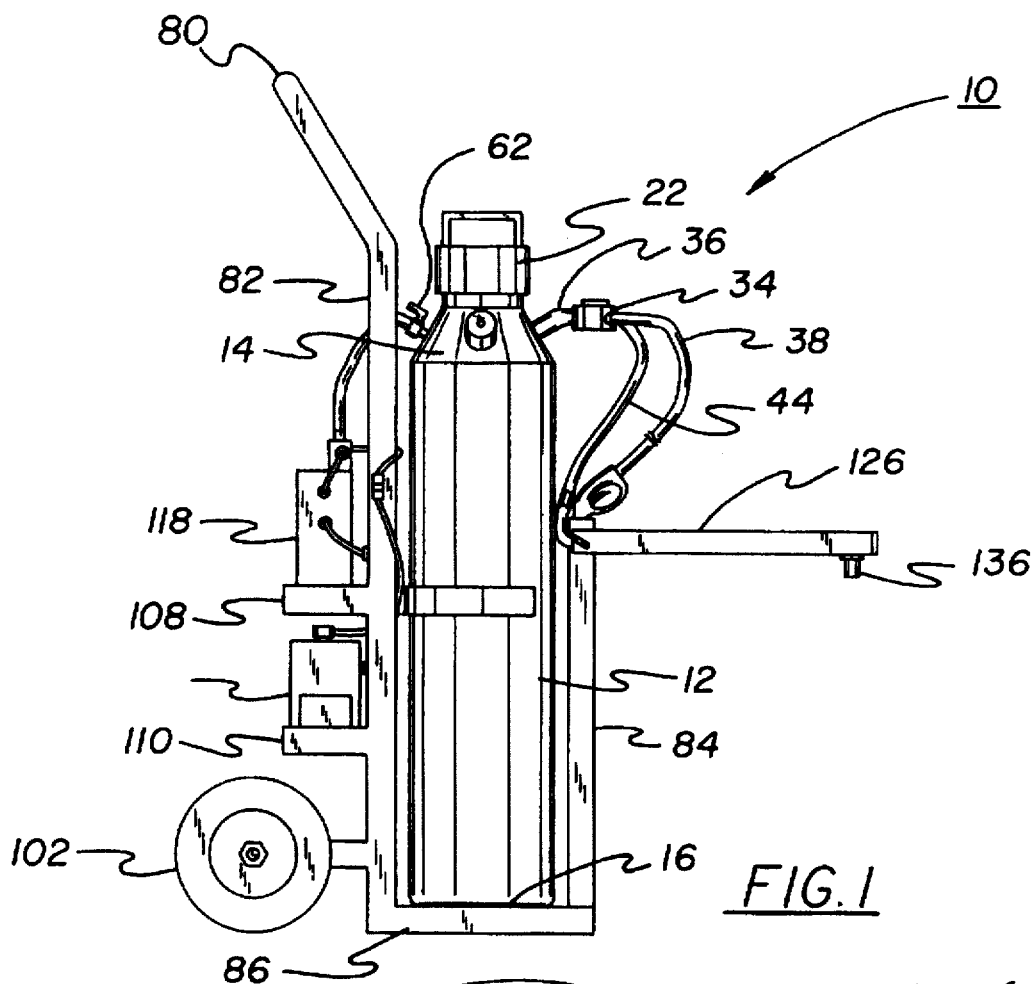
FIG. 1 is a perspective view of the preferred embodiment of the self contained portable sprayer system constructed in accordance with the principles of the present invention.

With reference now to the drawings, and in particular to FIG. 1 thereof, the preferred embodiment of the new and improved self contained portable sprayer system embodying the principles and concepts of the present invention and generally designated by the reference numeral 10 will be described.

The present invention, the self contained portable sprayer system 10 is comprised of a plurality of components. Such components in their broadest context include a tank, a towing hitch, an air pump, a power source, and a fluid release valve. Such components are individually configured and correlated with respect to each other so as to attain the desired objective.

Figure 5:
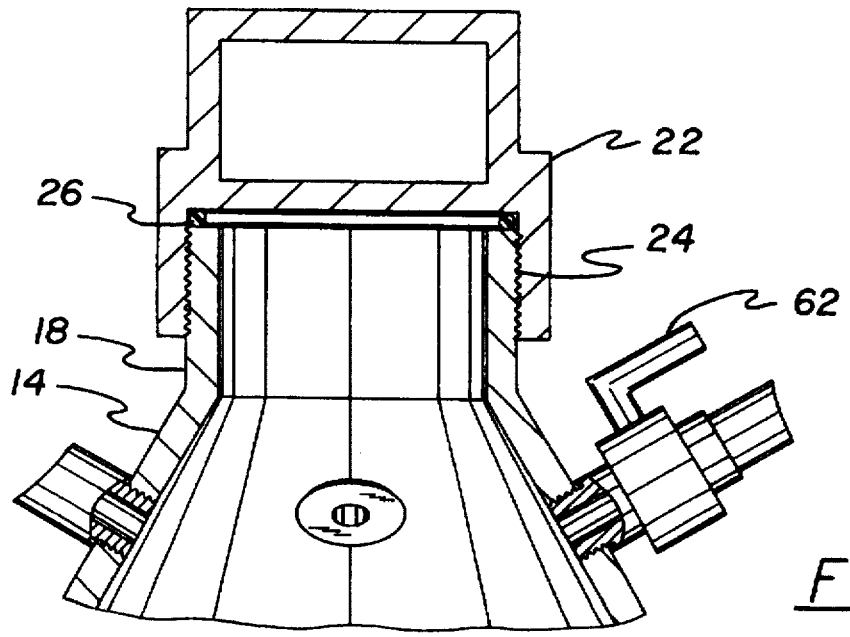
FIG. 5 is a cut-away sectional view of the present invention taken along line 5—5 of FIG. 3.

Specifically, the present invention includes a cylindrical pressurized tank 12. The tank has a top portion 14 and a flat bottom portion 16. As shown in FIG. 5, the top portion of the tank has a tank throat 18 with a cap 22 that is coupled to the throat. The tank cap is coupled to the tank throat by a threadable connection 24. Between the cap and the tank throat is an O-ring 26. The tank is capable of receiving a fluid mixture 30 that can be pressurized. The cap and the tank are formed of a lightweight metal that will not easily explode or expand. The metal must be able to house the fluid under pressurized conditions. The O-ring, between the sealing of the cap and the tank, aids in preventing air seepage or fluid seepage that usually results when the contents are placed under pressure.

Figure 6:
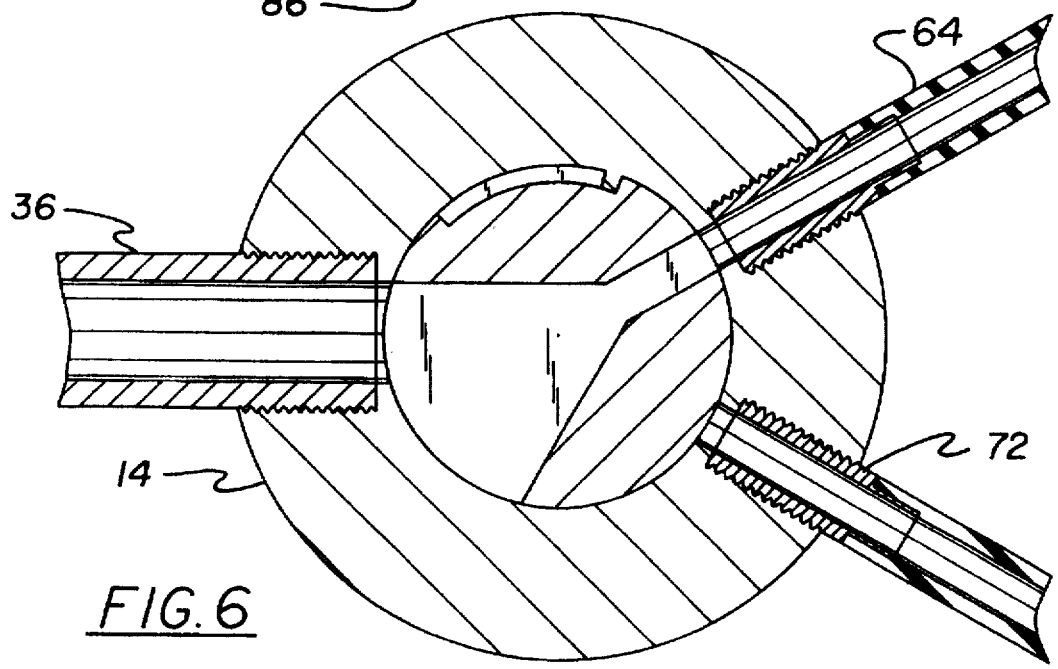
FIG. 6 is a cross sectional view of the present invention taken along line 6—6 of FIG. 2.

Included is a three-way fluid release valve 34 as shown in FIG. 1. The fluid release valve has a fluid release tube 36 at one end and a pair of flexible hoses 38 and 44 at another end. The fluid release tube is threadably connected to the top portion of the tank, as illustrated in FIG. 6. The fluid release tube allows the fluid mixture 30 from the tank 12 to pass therethrough. The pair of flexible hoses form a first hose 38 with a fluid control valve 42 and a second hose 44 that has a splitter connector 46. The fluid control valve has a wand 48.

As best illustrated in FIG. 2, the first hose 38 is made of a flexible tubing and has a length of about one and one half to two feet. The fluid control valve 42, that is connected to the first hose, has a pistol grip shaped handle 54 that includes a valve member, not shown, which would be biased into a position blocking a passage way extending through the pistol grip shaped handle. A trigger 56 is pivotally attached to the pistol grip handle and connected to the valve member. Pivoting of the trigger within the handle opens and closes the valve member to allow the fluid mixture to flow into the wand 48 for exiting through a spray head 58. The wand may be selectively directed toward lawns, gardens, building structures, equipment, and various other structures and surfaces.

The second hose, as shown in FIG. 2, is about one foot to one and one half feet in length and has a diameter of about one inch. The splitter connector 46 is a single unit that receives a portion of the second hose therein. The splitter connector may be formed of metal or a rigid plastic material. Either material must be non-reactive to a variety of chemical substances that are contained in the fluid mixture.

Also, a pressure switch 62 is provided. The pressure switch has an air receiving tube 64 at one end and a pressure hose 66 at another end. The air receiving tube is threadably connected to the top portion of the tank as shown in FIG. 6. The pressure hose, as shown in FIG. 3, is flexible tubing that has a length of about one to one and one half feet and a diameter of about one inch. The pressure switch operates like any conventionally available turn valve and controls the amount of pressurized air that enters the tank.

Additionally, a pressure release valve 70 is included. The pressure release valve is positioned on the top portion of the tank. The pressure release valve has a pressure release tubing 72, as shown in FIG. 6, that is threadably connected to the top portion of the tank 12. The pressure release valve has a regulator tee 74 that allows the release of an amount of air or air and fluid mix when the pressure in the tank raises past a safe level.

Figure 4:
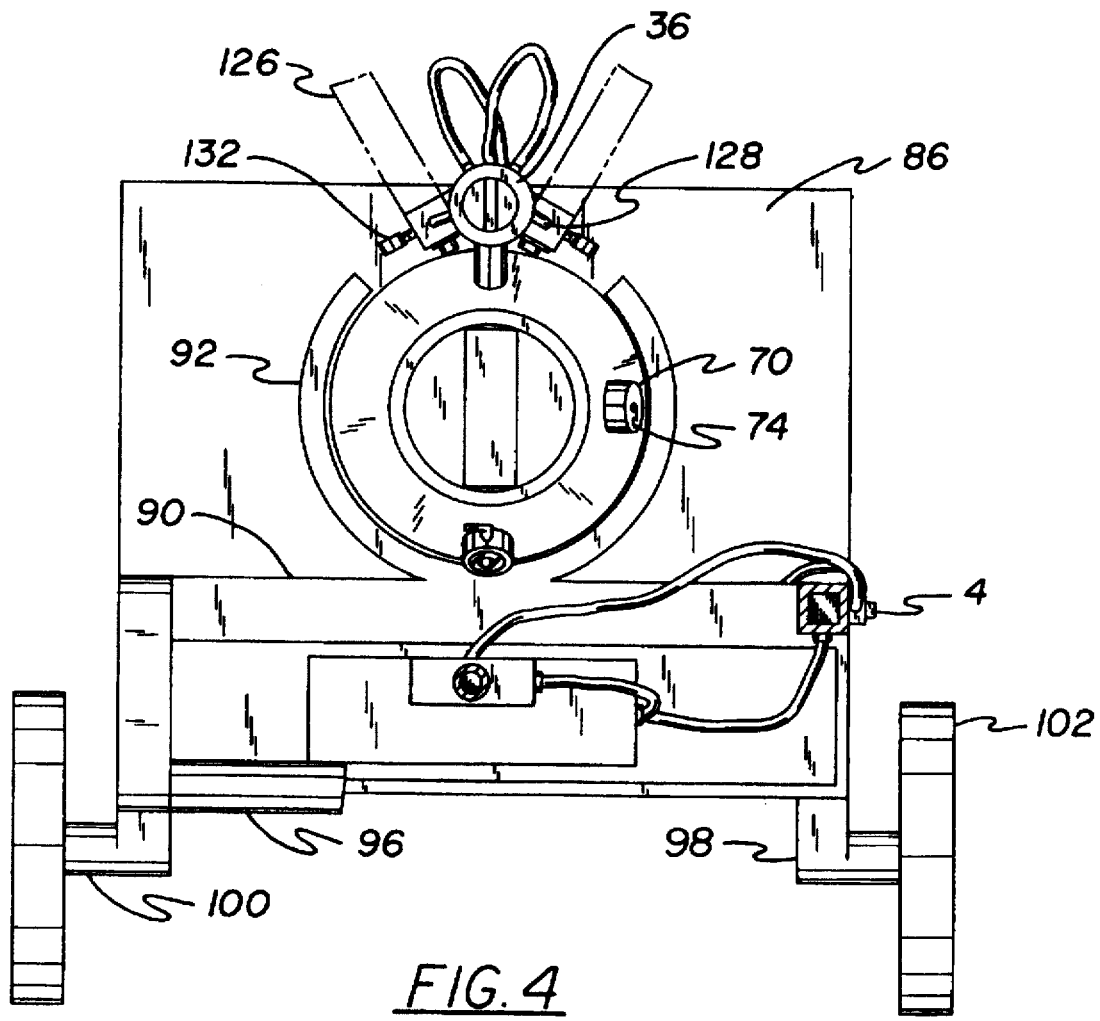
FIG. 4 is a top plane view of the present invention of the FIG. 1.

FIG. 1 shows a J-framed towing hitch 80. The towing hitch has an elongated vertical portion 82, a short vertical portion 84, and a horizontal lower portion 86. The hitch is made of metal tubing or solid metal joints fixedly attached. The elongated vertical portion has a proximal side 90 with a rigid semi-circular band 92 extending from the proximal side. FIG. 1 shows that the band is fixedly attached to the hitch. The horizontal lower portion, as shown in FIG. 4, is for seating the tank thereon when the tank is positioned within the towing hitch. The band slides around the tank when the tank is placed within the towing hitch. The band retains the positioning of the tank within the hitch and prevents the tank from slipping out of the hitch.

The elongated portion 82 has a distal side 96 with a pair of L-shaped projections 98. The L-shaped projections are spaced from the lower portion 86 and affixed to the elongated vertical portion. Each projection has a perpendicular end 100 with a wheel 102 rotatably mounted. The perpendicular end acts as an axle. When the towing hitch is at rest, the weight of the hitch, with the tank positioned thereon, rests on the wheels and the horizonal lower portion. The towing hitch may be pushed by tilting the hitch in a manner that allows the wheels to support the hitch. The hitch is tilted by pulling on a cross bar 104 that is fixedly attached to the elongated vertical portion.

As illustrated in FIG. 1, the distal side 96 has a pair of rectangular shelves proportionately spaced above the L-shaped projections 98. The shelves are rigidly affixed to the distal side. The pair of shelves are in parallel planes and form a top shelf 108 and a bottom shelf 110. The bottom shelf supports a power source 112. As shown in FIG. 3, the power source is seated on the bottom shelf and has a ground wire 114 attached to the elongated vertical portion.

A cyclic pump 118 is seated on the top shelf and is capable of receiving the pressure hose 64 that extends from the tank. The air pump, as shown in FIG. 3, is preferably any commercially available cyclic pump that will fit on the top shelf of the towing hitch. A cyclic pump, is preferred in order that the pump only runs in cycles, for preventing too much pressure to building up within the tank. The air pump forces air into the tank through the pressure hose. The pressurized air places the fluid in the tank under pressure for eventual fluid release through the fluid release tube 36. The air pump is powered by the power source seated on the frame hitch. The power source is activated by a switch 4 that is attached to a side of the elongated vertical portion. The switch, as shown in FIG. 4, is connected to the power source and the air pump.

Lastly, a dual boom 126 is rotatably mounted to the short vertical portion 84 of towing hitch. The dual boom is coupled to a pair of extents 128 of the short vertical by wing nuts 132, as shown in FIG. 4. The boom has a pair of receiving ends 134 that couple the splitter connector 46. The boom has a rubber stopper 136 that allows the boom to rest against the tank when the boom is not projected outward for fluid spray. The boom allows the fluid of the tank to be released separate from the wand when the three-way valve is turned to close the fluid passage way to the first hose.

The present invention provides a self contained portable sprayer system primarily used for spraying lawns or gardens. The system may be used with other applications, such as washing down homes, equipment, flooring, and spraying insect, to name a few. The system is made portable by the towing hitch and is self powered by having a power source seated on the towing hitch. The sprayer uses a cyclic air pump to pump air into the tank and places the fluid mixture under pressure for later release. The pump is operated by a switch that is attached to the side of the towing hitch. The switch allows the electrical charge to be transferred back and forth between the power source and the air pump. The tank carries large amounts of fluid mixture for spraying or washing down a large area. The system has two types of sprayers attached to it. One type has a wand and a spray head. The other is a boom-type which can be activated to spray continuously as the sprayer system is pushed along.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved self contained portable sprayer system for applying chemical treatments to a variety of surface areas comprising in combination:

a cylindrical pressurized tank having a top portion and a flat bottom portion, the top portion of the tank having a tank throat with a cap being coupled thereto, the tank cap being coupled to the tank throat by a threadable connection, the tank being capable of receiving therein a fluid mixture capable of being pressurized;

a three way fluid release valve having a fluid release tube at one end and a pair of flexible hoses at another end, the fluid release tube being threadablly connected to the top portion of the tank, the fluid release tube capable of allowing the fluid mixture from the tank to pass therethrough, the pair of flexible hoses forming a first hose with a fluid control valve and a second hose having a splitter connector, the fluid control valve having a wand;

a pressure switch having a air receiving tube at one end and a pressure hose at another end, the air receiving tube being threadablly connected to the top portion of the tank, the pressure switch being capable of controlling the amount of pressurized air entering the tank;

a pressure release valve being positionable on the top portion of the tank;

a J-framed towing hitch having an elongated vertical portion, a short vertical portion and a horizontal lower portion therebetween, the elongated vertical portion having a proximal side with a rigid semi-circular band extending therefrom, the horizontal lower portion being flat for allowing the tank to be seated thereon when positioned within the towing hitch, the band being capable of retaining the positioning of the tank within the hitch;

the elongated vertical portion having a distal side with a pair of L-shaped projections spaced from the lower portion and affixed thereto, each projection having a perpendicular end with a wheel rotatably mounted thereon, the distal side having a pair of rectangular shelves proportionately spaced above the L-shaped projection, the shelves being rigidly affixed to the distal side, the pair of shelves being in parallel planes and forming a top shelf and a bottom shelf, the bottom shelf capable of supporting a power source thereon;

a cyclic air pump being seated on the top shelf and capable of receiving the pressure hose extending from the tank, the air pump forcing air into the tank through the pressure hose for placing the fluid in the tank under pressure for eventual fluid release, the air pump being powered by the power source seated on the hitch, the power source being activated by a switch attached to a side of the elongated vertical portion; and a dual boom being rotatably mounted to the short vertical portion of the hitch, the boom having a pair of receiving ends capable of coupling the splitter connector, the boom being capable allowing the fluid of the tank to be released separate from the wand when the three way valves being turned.

2. A self contained portable sprayer system comprising:

a tank capable of receiving a fluid mixture, the tank having a top portion with a cap coupled thereto by a threadable connection and a flat bottom portion;

a fluid release valve having a fluid release tube at one end being threadably connected to the top portion and a pair of flexible hoses at another end;

a pressure switch having a air receiving tube at one end being threadablly connected to the top portion and a pressure hose at another end;

a pressure release valve being positionable on the top portion of the tank;

a towing hitch for carrying the tank having an elongated vertical portion, a short vertical portion and a flat lower portion therebetween, the elongated vertical portion having a proximal side and distal side, the lower portion seating the tank when positioned within the towing hitch, the distal side having a pair of wheels rotatably mounted thereon, and a pair of shelves with one shelf supporting a power source; and an cyclic air pump being positionable on another of the shelves and forcing air into the tank.

3. The self contained portable sprayer system as set forth in claim 2 wherein the tank being cylindrical and pressurized with a tank throat extending from the top portion, the tank throat having the cap being coupled to the tank throat by the threadable connection for maintaining the fluid mixture under pressure.

4. The self contained portable sprayer system as set forth in claim 2 wherein the fluid release valve being three way and capable of allowing the fluid mixture from the tank to pass from the fluid release tube into the pair of flexible hoses, and the pair of flexible hoses forming a first hose with a fluid control valve and a wand, and a second hose having a splitter connector.

5. The self contained portable sprayer system as set forth in claim 2 wherein the pressure hose of the pressure switch being attached to the air pump for receipt of the air being forced into the tank, and the pressure switch being capable of controlling the amount of pressurized air entering the tank.

6. The self contained portable sprayer system as set forth in claim 2 wherein the towing hitch having a J-framed shape with the elongated vertical portion having a rigid semi-circular band extending from the proximal side, and the band being capable of retaining the positioning of the tank within the hitch.

7. The self contained portable sprayer system as set forth in claim 6 wherein the distal side of the elongated vertical portion having a pair of L-shaped projections affixed thereto and spaced from the lower portion, and each projection with a perpendicular end having the wheels rotatably mounted.

8. The self contained portable sprayer system as set forth in claim 7 wherein the pair of shelves of the distal side being rectangular and proportionately spaced above the L-shaped projection, the pair of shelves forming a top shelf and a bottom shelf with each shelf being rigidly affixed to the distal side in parallel planes, and the one shelf being the bottom shelf.

9. The self contained portable sprayer system as set forth in claim 2 wherein the forced air from the air pump being capable a placing the fluid mixture in the tank under pressure for eventual fluid release, and the air pump being powered by the power source seated on the hitch with the power source being activated by a switch attached to a side of the elongated vertical portion.

10. The self contained portable sprayer system as set forth in claim 4 wherein the short vertical of the hitch having a dual boom being rotatably mounted thereto, the boom having a pair of receiving ends capable of coupling the splitter connector, the boom being capable of receiving the fluid passing from the splitter to be released under pressure.

* * * * *